United States Patent
Lin

(10) Patent No.: US 12,449,724 B2
(45) Date of Patent: Oct. 21, 2025

(54) PROJECTION DEVICE AND LIGHT SOURCE SYSTEM THEREOF

(71) Applicant: DELTA ELECTRONICS, INC., Taoyuan (TW)

(72) Inventor: Hung-Ying Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 456 days.

(21) Appl. No.: 18/058,272

(22) Filed: Nov. 23, 2022

(65) Prior Publication Data
US 2023/0408896 A1 Dec. 21, 2023

(30) Foreign Application Priority Data
Jun. 17, 2022 (CN) .......................... 202210691761.0

(51) Int. Cl.
*G03B 21/20* (2006.01)

(52) U.S. Cl.
CPC ....... *G03B 21/204* (2013.01); *G03B 21/2013* (2013.01); *G03B 21/2053* (2013.01); *G03B 21/2066* (2013.01); *G03B 21/208* (2013.01)

(58) Field of Classification Search
CPC .............. G03B 21/204; G03B 21/2013; G03B 21/2053; G03B 21/2066; G03B 21/208; G03B 21/206; G02B 27/1006; H04N 9/315; H04N 9/3161; H04N 9/3164
USPC .......................................................... 353/98
See application file for complete search history.

(56) References Cited

U.S. PATENT DOCUMENTS

| | | | |
|---|---|---|---|
| 8,662,678 B2 | 3/2014 | Hirata et al. | |
| 2011/0199580 A1* | 8/2011 | Hirata | G03B 21/2066 353/31 |
| 2012/0243205 A1 | 9/2012 | Lin | |
| 2013/0258292 A1* | 10/2013 | Lin | G03B 21/2066 353/31 |
| 2013/0271947 A1* | 10/2013 | Finsterbusch | F21V 13/08 362/19 |
| 2017/0293212 A1* | 10/2017 | Wang | F21V 29/70 |
| 2017/0343891 A1* | 11/2017 | Sakata | G03B 21/2013 |
| 2020/0319542 A1* | 10/2020 | Pan | G02B 27/141 |

FOREIGN PATENT DOCUMENTS

| | | |
|---|---|---|
| CN | 213904045 U | 8/2021 |
| TW | 201239507 A | 10/2012 |
| TW | 201239508 A | 10/2012 |

(Continued)

*Primary Examiner* — Magda Cruz
(74) *Attorney, Agent, or Firm* — CKC & Partners Co., LLC

(57) ABSTRACT

The disclosure provides projection device and light source system thereof. The light source system includes a first light source, a second light source, a curved surface reflection element and a wavelength conversion element. The first light source is configured to emit a first light beam. The second light source is configured to emit a second light beam. The curved surface reflection element has a first focal point and a groove, wherein the groove is adjacent to the first focal point. The wavelength conversion element is arranged through the groove and has a first surface and a second surface, wherein the first light beam is incident on a first area of the first surface where the first focal point located, and the second light beam is incident on a second area of the second surface where the first focal point located.

18 Claims, 6 Drawing Sheets

(56) References Cited

FOREIGN PATENT DOCUMENTS

| TW | I446094 B | 7/2014 |
| TW | 201736940 A | 10/2017 |
| TW | 202141074 A | 11/2021 |

* cited by examiner

PROJECTION DEVICE AND LIGHT SOURCE SYSTEM THEREOF

CROSS-REFERENCE TO RELATED APPLICATION

This application claims priority to China Application Serial Number 202210691761.0, filed Jun. 17, 2022, which is herein incorporated by reference in its entirety.

BACKGROUND

Field of Invention

This disclosure relates to a light source system, and in particular to the light source system of a projection device.

Description of Related Art

Following the development of projectors, some high-level models require to use the red light laser. Some traditional approaches add the red light beam emitted by the red light laser into the existing optical system through the dichroic mirror. However, the traditional approaches often cause the problems such as complicated optical system, high cost, etc.

SUMMARY

An aspect of present disclosure relates to a light source system. The light source system includes a first light source, a second light source, a curved surface reflection element and a wavelength conversion element. The first light source is configured to emit a first light beam. The second light source is configured to emit a second light beam, wherein the first light beam has a color or a wavelength range different from those of the second light beam. The curved surface reflection element has a first focal point, a first curved surface, a second curved surface and a groove, wherein the first curved surface and the second curved surface are opposite to each other, and the groove is configured between the first curved surface and the second curved surface and is adjacent to the first focal point. The wavelength conversion element is arranged through the groove and has a first surface and a second surface opposite to each other, wherein the first light beam is incident on a first area of the first surface where the first focal point located, and the second light beam is incident on a second area of the second surface where the first focal point located.

Another aspect of present disclosure relates to a projection device. The projection device includes a light source system, a light modulator and an imaging module. The light source system is configured to generate an illumination light beam and includes a first light source, a second light source and a color light beam generation module. The first light source is configured to emit a first light beam. The second light source is configured to emit a second light beam, wherein color or wavelength range of the first light beam is different from the second light beam. The color light beam generation module is located between the first light source and the second light source, is configured to receive the first light beam to output the first light beam and a third light beam on a first side of an imaginary line and is configured to receive the second light beam to output the second light beam on a second side of the imaginary line, wherein an extended line of the imaginary line is partially overlapped with an output path of the illumination light beam, the first side and the second side of the imaginary line are opposite to each other, and the third light beam has different wavelength range from the first light beam and the second light beam. The light modulator is configured to convert the illumination light beam into an image light beam. The imaging module is configured to project the image light beam to generate an image picture.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms "coupled" or "connected" as used herein may mean that two or more elements are directly in physical or electrical contact, or are indirectly in physical or electrical contact with each other. It can also mean that two or more elements interact with each other.

Figure 1:
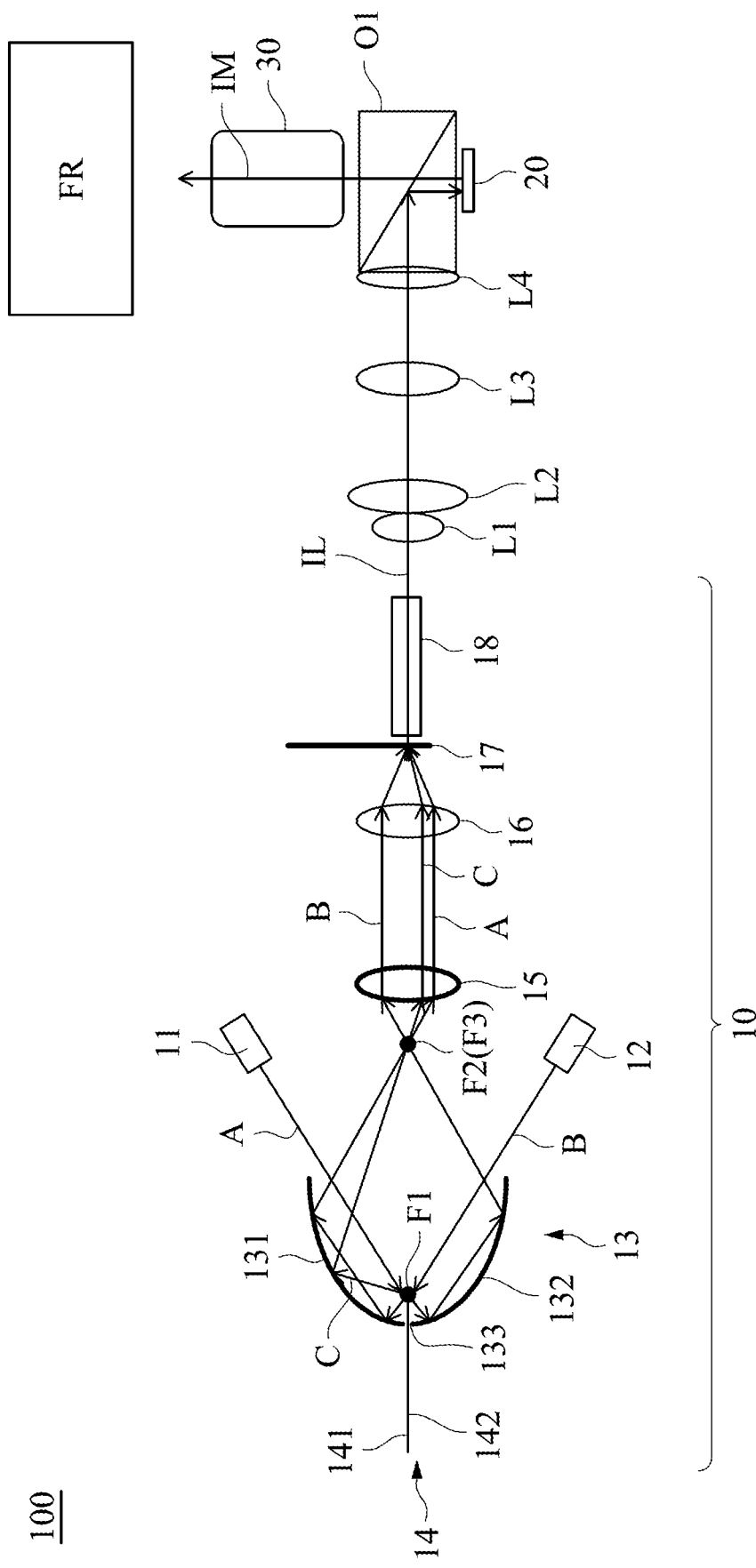
FIG. 1 is a schematic diagram of a projection device in accordance with some embodiments of the present disclosure.

Referring to FIG. 1, FIG. 1 is a schematic diagram of a projection device 100 in accordance with some embodiments of the present disclosure. In some embodiments, the projection device 100 includes a light source system 10, a light modulator 20 and an imaging module 30. As shown in FIG. 1, the light source system 10 is configured to generate an illumination light beam IL. The light modulator 20 is configured to convert the illumination light beam IL into an image light beam IM. The imaging module 30 is configured to project the image light beam IM to generate an image picture FR on a projection plane (e.g., projection screen, wall, etc.) for a user to observe. In some embodiments, the light modulator 20 can be implemented by a digital micromirror device (DMD), and the imaging module 30 can be implemented by a lens.

In some embodiments, as shown in FIG. 1, the light source system 10 includes a first light source 11, a second light source 12 and a color light beam generation module. In particular, the first light source 11 is configured to emit a first light beam A, and the second light source 12 is configured to emit a second light beam B. In the embodiments of FIG. 1, the first light source 11 is implemented by a blue light laser or a blue light emitting diode (LED), and the first light beam A is a blue light beam. Also, the second light source 12 is implemented by a red light laser or a red LED, and the second light beam B is a red light beam. In other words, the second light source 12 has a color different from that of the first light source 11, and the first light beam A has a color or a wavelength range different from those of the second light beam B.

In some embodiments, as shown in FIG. 1, the color light beam generation module is located between the first light source 11 and the second light source 12 and includes a curved surface reflection element 13 and a wavelength conversion element 14. The curved surface reflection element 13 has a first focal point F1, a second focal point F2, a first curved surface 131, a second curved surface 132 and a groove 133. In particular, the first curved surface 131 and the second curved surface 132 are opposite to each other, and the groove 133 is configured between the first curved surface 131 and the second curved surface 132 and is adjacent to the first focal point F1. In some embodiments, the first curved surface 131 and the second curved surface 132 each is an ellipsoid surface.

Figure 2A:
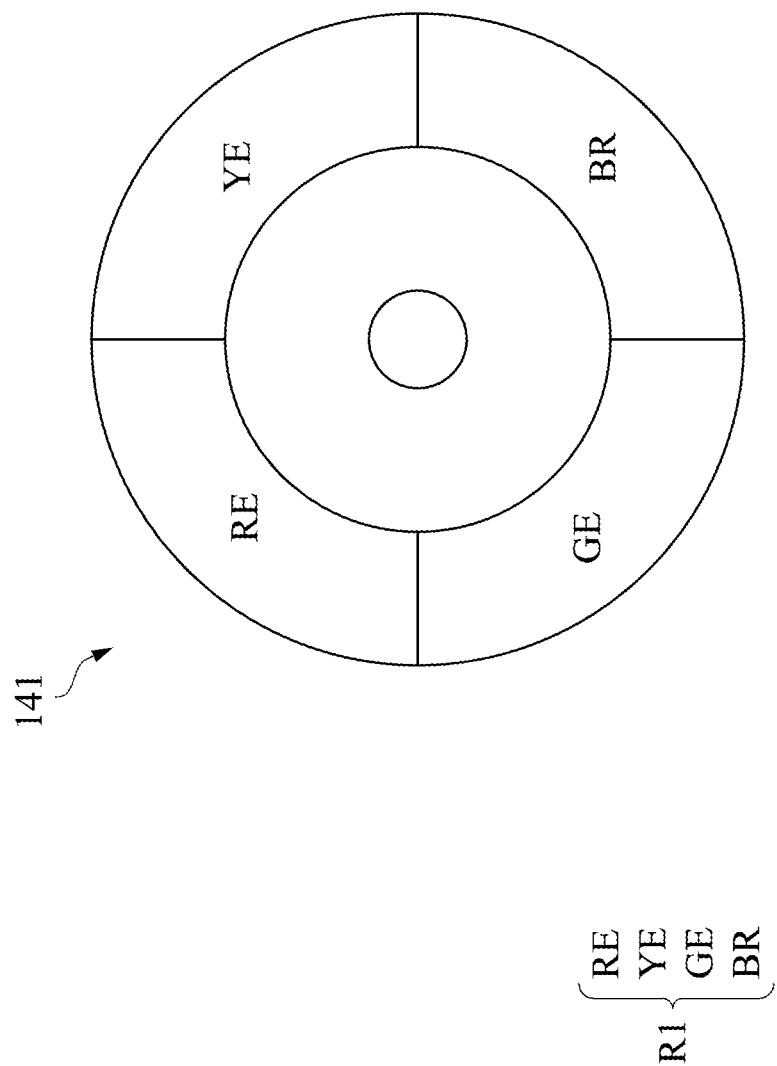
FIG. 2A is a schematic diagram of a first surface of a wavelength conversion element in accordance with some embodiments of the present disclosure.
Figure 2B:
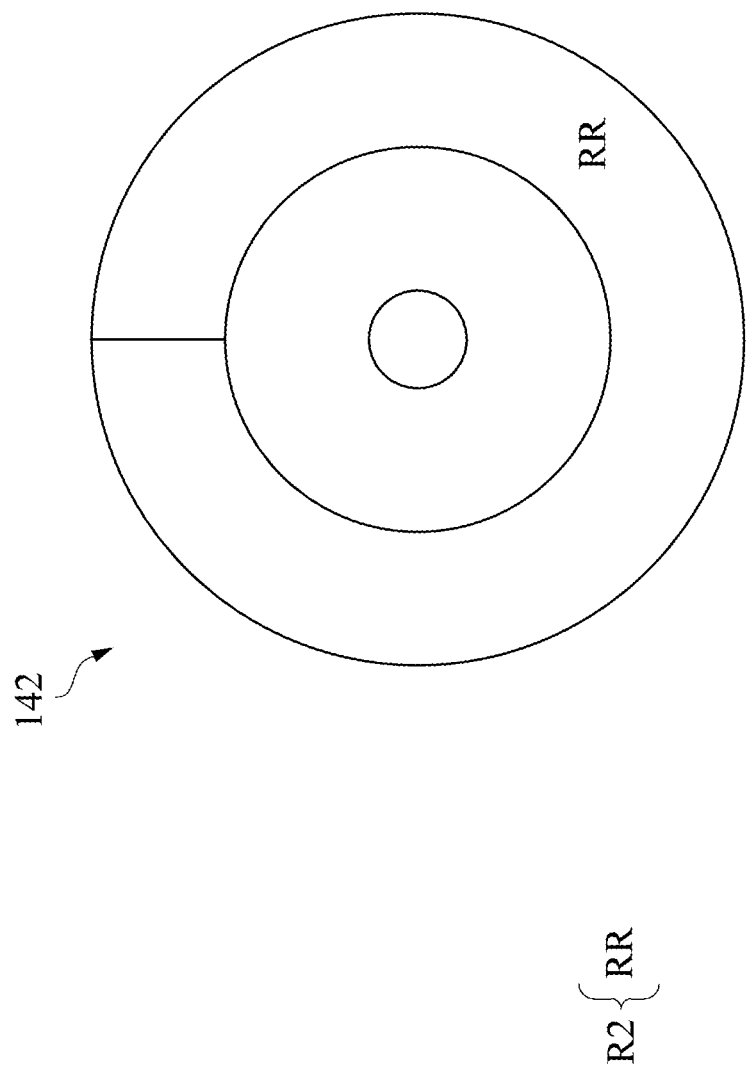
FIG. 2B is a schematic diagram of a second surface of the wavelength conversion element in accordance with some embodiments of the present disclosure.

As shown in FIG. 1 again, the wavelength conversion element 14 is rotatably arranged through the groove 133 and has a first surface 141 and a second surface 142. The first surface 141 and the second surface 142 are opposite to each other. For example, the first surface 141 is a top surface, and the second surface 142 is a bottom surface. The wavelength conversion element 14 would be described in detail below with reference to FIGS. 2A and 2B. Referring to FIGS. 2A and 2B, FIG. 2A is a schematic diagram of the first surface 141 of the wavelength conversion element 14 in accordance with some embodiments of the present disclosure, and FIG. 2B is a schematic diagram of the second surface 142 of the wavelength conversion element 14 in accordance with some embodiments of the present disclosure.

As shown in FIG. 2A, the first surface 141 of the wavelength conversion element 14 includes a first area R1. In some embodiments, the first area R1 includes at least one light excitation region and a first light reflection region BR. For example, as shown in FIG. 2A, the first area R1 includes three light excitation regions GE, RE and YE (i.e., the at least one light excitation region).

Referring to FIGS. 1 and 2A together, when the wavelength conversion element 14 is rotated in the groove 133 with respect to the curved surface reflection element 13, the first focal point F1 of the curved surface reflection element 13 would be sequentially dropped into the light excitation region GE, the light excitation region RE, the light excitation region YE and the first light reflection region BR. In other words, the first focal point F1 of the curved surface reflection element 13 is located in the first area R1 on the first surface 141 of the wavelength conversion element 14.

As shown in FIG. 2B, the second surface 142 of the wavelength conversion element 14 includes a second area R2. In some embodiments, the second area R2 includes a second light reflection region RR.

Referring to FIGS. 1 and 2B together, the first focal point F1 of the curved surface reflection element 13 would be dropped into the second light reflection region RR when the wavelength conversion element 14 is rotated in the groove 133 with respect to the curved surface reflection element 13. In other words, the first focal point F1 of the curved surface reflection element 13 is located in the second area R2 on the second surface 142 of the wavelength conversion element 14.

In some embodiments, as shown in FIG. 1, the first light source 11 substantially emits the first light beam A towards the first focal point F1 of the curved surface reflection element 13, and the second light source 12 substantially emits the second light beam B towards the first focal point F1 of the curved surface reflection element 13. In such arrangements, the first light beam A is incident on the first area R1 of the first surface 141 where the first focal point F1 located, and the second light beam B is incident on the second area R2 of the second surface 142 where the first focal point F1 located.

It can be appreciated that when the wavelength conversion element 14 is rotated in the groove 133 with respect to the curved surface reflection element 13, the first light beam A might be incident on one of the light excitation region GE, the light excitation region RE, the light excitation region YE and the first light reflection region BR according to the timing sequence. In some embodiment, the first light beam A is incident on the first light reflection region BR, and the first light reflection region BR is configured to reflect the first light beam A to the first curved surface 131. In some embodiments, the first light beam A is incident on one of the three light excitation regions GE, RE and YE, and the three light excitation regions GE, RE and YE each is configured to generate a third light beam C to the first curved surface 131 through exciting of the first light beam A. In addition, when the wavelength conversion element 14 is rotated in the groove 133 with respect to the curved surface reflection element 13, the second light beam B is incident on the second light reflection region RR, and the second light reflection region RR is configured to reflect the second light beam B to the second curved surface 132.

In particular, at least one fluorescent layer is formed on the at least one light excitation region of the first area R1. For example, a fluorescent layer, which is configured to generate a green light beam (i.e., the third light beam C) through exciting of the blue light beam (i.e., the first light beam A), is formed on the light excitation region GE. A fluorescent layer, which is configured to generate a red light beam (i.e., the third light beam C) through exciting of the blue light beam (i.e., the first light beam A), is formed on the light excitation region RE. A fluorescent layer, which is configured to generate a yellow light beam (i.e., the third light beam C) through exciting of the blue light beam (i.e., the first light beam A), is formed on the light excitation region YE.

In addition, a first light diffusion layer is formed on the first light reflection region BR, which is configured to reflect the blue light beam (i.e., the first light beam A). A second light diffusion layer is formed on the second light reflection region RR, which is configured to reflect the red light beam (i.e., the second light beam B). It can be appreciated that the red light beam (i.e., the third light beam C) be generated by the light excitation region RE has a larger wavelength range than the red light beam (i.e., the second light beam B) be generated directly by the second light source 12.

Figure 3:
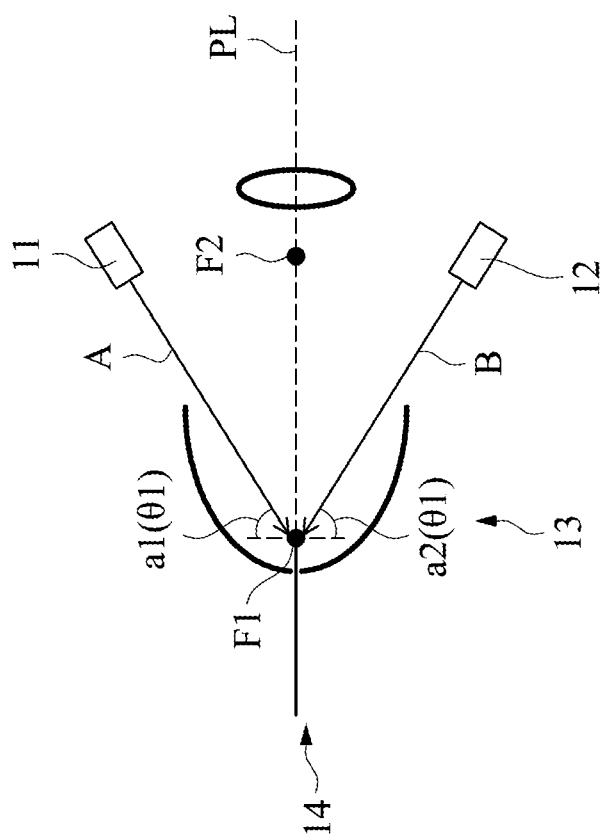
FIG. 3 is a schematic diagram of part components of a light source system in accordance with some embodiments of the present disclosure.

Referring to FIG. 3, FIG. 3 is a schematic diagram of part components of the light source system 10 in FIG. 1. As shown in FIG. 3, an imaginary line PL passes through the first focal point F1 and the second focal point F2. In some embodiments, as shown in FIGS. 1 and 3, the first light source 11 is on a first side (e.g., a top side) of the imaginary line PL to emit the first light beam A towards the first focal point F1, so that the first light beam A and the third light beam C are outputted by the curved surface reflection element 13 and the wavelength conversion element 14. Again, the second light source 12 is on a second side (e.g., a bottom side) of the imaginary line PL to emit the second light beam B towards the first focal point F1, so that the second light beam B is outputted by the curved surface reflection element 13 and the wavelength conversion element 14.

It can be seen from above descriptions that the color light beam generation module (i.e., the curved surface reflection element 13 and the wavelength conversion element 14) is configured to receive the first light beam A on the first side of the imaginary line PL to output the first light beam A and the third light beam C and is configured to receive the second light beam B on the second side of the imaginary line PL to output the second light beam B.

In some embodiments, as shown in FIG. 1, since the first curved surface 131 and the second curved surface 132 each is an ellipsoid surface, the first curved surface 131 is configured to reflect the first light beam A and the third light beam C from the first focal point F1 to the second focal point F2, and the second curved surface 132 is configured to reflect the second light beam B from the first focal point F1 to the second focal point F2.

In the embodiments of FIG. 1, the light source system 10 further includes a first lens 15, a second lens 16, a filter element 17 and an uniformity element 18. As shown in FIG. 1, the first lens 15 has a third focal point F3, wherein the third focal point F3 is substantially in a position same as that of the second focal point F2 of the curved surface reflection element 13. Accordingly, the first lens 15 is configured to parallelize the first light beam A, the second light beam B and the third light beam C from the second focal point F2. The second lens 16 is configured to focus the first light beam A, the second light beam B and the third light beam C which are parallelized. The filter element 17 is configured to filter the first light beam A, the second light beam B and the third light beam C which are focused. The uniformity element 18 is configured to uniform the first light beam A, the second light beam B and the third light beam C which are filtered, to generate the illumination light beam IL.

In particular, the first lens 15 and the second lens 16 each can be implemented by a convex lens. The filter element 17 can be implemented by a filter wheel. The uniformity element 18 can be implemented by a light tunnel. However, the present disclosure is not limited thereto.

In the embodiments of FIG. 1, the projection device 100 further includes a plurality of lens units L1-L4 and an optical element O1. As shown in FIG. 1, the lens units L1-L4 are arranged between the uniformity element 18 of the light source system 10 and the optical element O1 and are configured to transmit the illumination light beam IL to the optical element O1. The optical element O1 is configured to reflect the illumination light beam IL to the light modulator 20 and is configured to transmit the image light beam IM generated by the light modulator 20 to the imaging module 30.

It can be appreciated that if the imaginary line PL as shown in FIG. 3 is illustrated in FIG. 1, an extended line of the imaginary line PL is partially overlapped with an output path (i.e., a horizontal transmission path as shown in FIG. 1) of the illumination light beam IL.

In the above embodiments, as shown in FIG. 3, the first light source 11 and the second light source 12 are arranged symmetrically with respect to the imaginary line PL. In addition, the first light beam A is incident on the first area R1 on the wavelength conversion element 14 at a first incident angle a1, the second light beam B is incident on the second area R2 on the wavelength conversion element 14 at a second incident angle a2, and the first incident angle a1 (e.g., θ1 degrees) and the second incident angle a2 (e.g., θ1 degrees) are same. However, the present disclosure is not limited thereto, which would be described in detail below with reference to FIG. 4.

Figure 4:
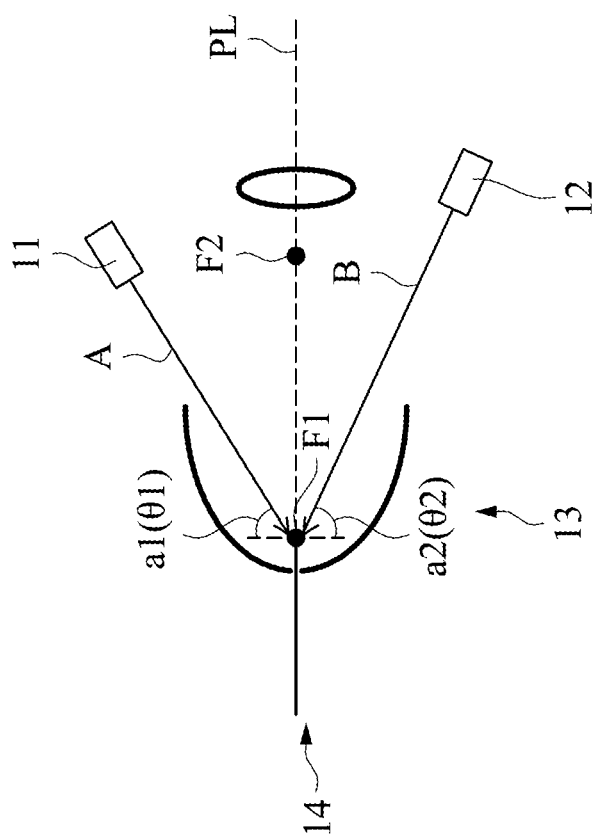
FIG. 4 is a schematic diagram of part components of a light source system in accordance with some embodiments of the present disclosure.

Referring to FIG. 4, FIG. 4 is a schematic diagram of part components of the light source system 10 in accordance with some embodiments of the present disclosure. In some embodiments, as shown in FIG. 4, the first light source 11 and the second light source 12 are arranged asymmetrically with respect to the imaginary line PL. The first incident angle a1 (e.g., θ1 degrees) is different from the second incident angle a2 (e.g., θ2 degrees). Other arrangements and operations of the embodiments of FIG. 4 are same or similar to those of the above embodiments, and therefore are omitted herein.

Figure 5:
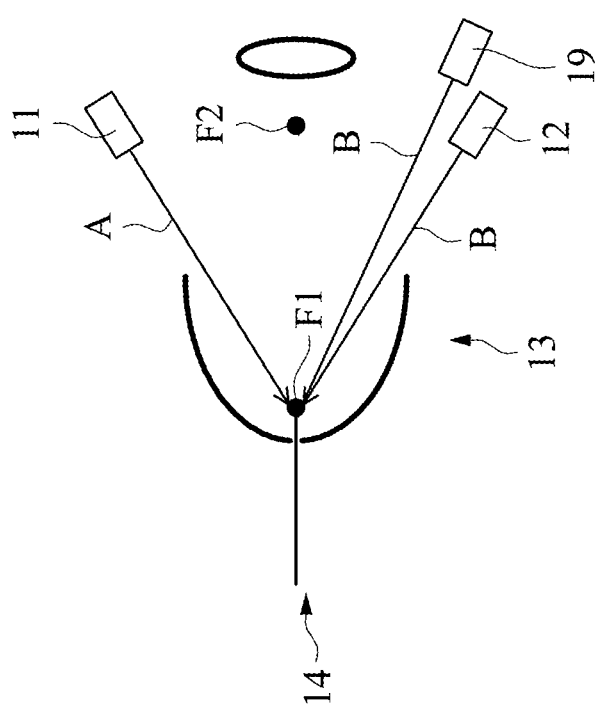
FIG. 5 is a schematic diagram of part components of a light source system in accordance with some embodiments of the present disclosure.

In the above embodiments, the light source system 10 includes only one light source (i.e., the second light source 12) configured to emit the red light beam (i.e., the second light beam B). However, the present disclosure is not limited thereto, which would be described in detail below with reference to FIG. 5. Referring to FIG. 5, FIG. 5 is a schematic diagram of part components of the light source system 10 in accordance with some embodiments of the present disclosure. In some embodiments, as shown in FIG. 5, the light source system 10 further includes a third light source 19, wherein the third light source 19 is same as the second light source 12 to emit the red light beam (i.e., the second light beam B) to the second area R2. The second area R2 is on the second surface 142 of the wavelength conversion element 14, and the first focal point F1 is in the second area R2. It can be seen from these that the light source system 10 can include a plurality of light sources (i.e., the second light source 12 and the third light source 19) each configured to emit the second light beam B.

By illustrating the imaginary line PL as shown in FIG. 3 in FIG. 5, it can be seen that the color light beam generation module (i.e., the curved surface reflection element 13 and the wavelength conversion element 14) of the projection device 100 is further configured to receive the second light beam B be emitted by the third light source 19 on the second side of the imaginary line PL.

It can be seen from the above embodiments of the present disclosure that the light source system 10 of the present disclosure uses the first light beam A, the second light beam B and the third light beam C to generate the suitable illumination light beam IL by diffusing the second light beam B (i.e., the red light beam) emitted by the second light source 12, wherein the first light beam A, the second light beam B and the third light beam C are different with each other. Furthermore, in comparison to the known art which makes the red light beam coincide with different-colored light beams by a beam splitter, the projection device 100 using the light source system 10 of the present disclosure has the advantage of generating light spot hardly.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A light source system, comprising:
a first light source configured to emit a first light beam;
a second light source configured to emit a second light beam, wherein the first light beam has a color or a wavelength range different from those of the second light beam;
a curved surface reflection element having a first focal point, a first curved surface, a second curved surface and a groove, wherein the first curved surface and the second curved surface are opposite to each other, and the groove is configured between the first curved surface and the second curved surface and is adjacent to the first focal point; and
a wavelength conversion element arranged through the groove and having a first surface and a second surface opposite to each other, wherein the first light beam is incident on a first area of the first surface where the first focal point located, and the second light beam is incident on a second area of the second surface where the first focal point located,
wherein the first area comprises at least one light excitation region and a first light reflection region, at least one light excitation region is configured to generate a third light beam through exciting of the first light beam, and the first light reflection region is configured to reflect the first light beam,
wherein the second area comprises a second light reflection region, and the second light reflection region is configured to reflect the second light beam.

2. The light source system of claim 1, wherein at least one fluorescent layer is formed on the at least one light excitation region, a first light diffusion layer is formed on the first light reflection region, and a second light diffusion layer is formed on the second light reflection region.

3. The light source system of claim 1, wherein the curved surface reflection element further has a second focal point, the first curved surface is configured to reflect the first light beam and the third light beam to the second focal point, and the second curved surface is configured to reflect the second light beam to the second focal point.

4. The light source system of claim 3, wherein the light source system further comprises:
a first lens having a third focal point and configured to parallelize the first light beam, the second light beam and the third light beam, wherein the third focal point of the first lens is substantially in a position same as that of the second focal point of the curved surface reflection element;
a second lens configured to focus the first light beam, the second light beam and the third light beam which are parallelized;
a filter element configured to filter the first light beam, the second light beam and the third light beam which are focused; and
an uniformity element configured to uniform the first light beam, the second light beam and the third light beam which are filtered, to generate an illumination light beam.

5. The light source system of claim 3, wherein the first light source and the second light source are arranged symmetrically or asymmetrically with respect to an imaginary line passing through the first focal point and the second focal point.

6. The light source system of claim 1, wherein the first light beam is incident on the first area at a first incident angle, the second light beam is incident on the second area at a second incident angle, and the first incident angle and the second incident angle are same or different.

7. The light source system of claim 1, wherein the light source system further comprises a third light source, and the third light source is configured to emit the second light beam.

8. The light source system of claim 1, wherein the first curved surface and the second curved surface each is an ellipsoid surface.

9. The light source system of claim 1, wherein the first light beam is a blue light beam, and the second light beam is a red light beam.

10. A projection device, comprising:
a light source system configured to generate an illumination light beam and comprising:
a first light source configured to emit a first light beam;
a second light source configured to emit a second light beam,
wherein color or wavelength range of the first light beam is different from the second light beam; and
a color light beam generation module located between the first light source and the second light source, configured to receive the first light beam to output the first light beam and a third light beam on a first side of an imaginary line, and configured to receive the second light beam to output the second light beam on a second side of the imaginary line, wherein an extended line of the imaginary line is partially overlapped with an output path of the illumination light beam, the first side and the second side of the imaginary line are opposite to each other, and the third light beam has different wavelength range from the first light beam and the second light beam;
a light modulator configured to convert the illumination light beam into an image light beam; and
an imaging module configured to project the image light beam to generate an image picture,
wherein the color light beam generation module comprises:
a curved surface reflection element having a first focal point, a second focal point, a first curved surface, a second curved surface and a groove, wherein the imaginary line passes through the first focal point and the second focal point, the first curved surface and the second curved surface are opposite to each other, and the groove is between the first curved surface and the second curved surface and is adjacent to the first focal point; and
a wavelength conversion element arranged through the groove and having a first surface and a second surface opposite to each other, wherein the first light beam is incident on a first area of the first surface where the first focal point located, and the second light beam is incident on a second area of the second surface where the first focal point located,
wherein the first area comprises at least one light excitation region and a first light reflection region, the at least one light excitation region is configured to generate the third light beam through exciting of the first light beam, and the first light reflection region is configured to reflect the first light beam,
wherein the second area comprises a second light reflection region, the second light reflection region is configured to reflect the second light beam to the second curved surface.

11. The projection device of claim 10,
wherein the second curved surface is configured to reflect the second light beam to the second focal point.

12. The projection device of claim 11, wherein at least one fluorescent layer is formed on the at least one light excitation region, a first light diffusion layer is formed on the first light reflection region, and a second light diffusion layer is formed on the second light reflection region.

13. The projection device of claim 11, wherein the light source system further comprises:
- a first lens having a third focal point and configured to parallelize the first light beam, the second light beam and the third light beam from the second focal point, wherein the third focal point of the first lens is substantially in a position same as that of the second focal point of the curved surface reflection element;
- a second lens configured to focus the first light beam, the second light beam and the third light beam which are parallelized;
- a filter element configured to filter the first light beam, the second light beam and the third light beam which are focused; and
- an uniformity element configured to uniform the first light beam, the second light beam and the third light beam which are filtered, to generate the illumination light beam.

14. The projection device of claim 10, wherein the first light source and the second light source are arranged symmetrically or asymmetrically with respect to the imaginary line.

15. The projection device of claim 10, wherein the first light beam is incident on the first area at a first incident angle, the second light beam is incident on the second area at a second incident angle, and the first incident angle and the second incident angle are same or different.

16. The projection device of claim 10, wherein the first curved surface and the second curved surface each is an ellipsoid surface.

17. The projection device of claim 10, wherein the light source system further comprises a third light source, the third light source is configured to emit the second light beam, and the color light beam generation module is configured to receive the second light beam emitted by the third light source on the second side of the imaginary line.

18. The projection device of claim 10, wherein the first light beam is a blue light beam, and the second light beam is a red light beam.

* * * * *